UNITED STATES PATENT OFFICE.

KARL JEDLICKA AND ARNOLD SCHEDLER, OF BASEL, SWITZERLAND, ASSIGNOR TO THE FIRM OF SOCIETY OF CHEMICAL INDUSTRY IN BASLE, OF BASEL, SWITZERLAND.

RED TETRAZO DYE.

No. 889,016.  Specification of Letters Patent.  Patented May 26, 1908.

Application filed May 14, 1907. Serial No. 373,632.

*To all whom it may concern:*

Be it known that we, KARL JEDLICKA and ARNOLD SCHEDLER, both chemists and doctors of philosophy, citizens of the Swiss Republic, and residents of Basel, Switzerland, have invented new and useful Red Tetrazo Dyestuffs and a Process for the Manufacture of the Same, of which the following is a full, clear, and exact specification.

It has been found, that new valuable tetrazo-dyestuffs can be obtained by combining one molecule of the tetrazo-derivative of an azooxyamin of the formula:

(where R represents the rest of an aromatic radical, such as $C_6H_4$, $C_6H_3.CH_3$, $C_6H_3.OCH_3$, $C_6H_2(CH_3)_2$ etc.) with two equal or different molecules of amidoarylacidyl-amidonaphtholsulfonic acids of the general formula:

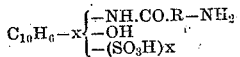

wherein R has the same signification as above.

The dyestuffs which may be obtained in this way constitute in dry state red to reddish-brown powders which dissolve in water with yellowish-red to bluish-red coloration and dye unmordanted cotton clear, orange-red to bluish-red tints. By diazotation on the fiber and subsequent development with beta-naphthol they yield valuable red tints which besides their good fastness to acids distinguish themselves by a great solidity to washing.

The process for the manufacture of the new dyestuffs is illustrated by the following examples:

Example I: 22.8 kilos of meta-diamidoazoxybenzene (obtained from meta-nitroanilin) are dissolved by adding 50 kilos of concentrated hydrochloric acid and diazotized, while cooled by ice, with 14 kilos of sodium nitrite, whereupon the tetrazo-solution is poured into a solution of 88 kilos of meta-amidobenzoyl-2-amido-5-naphthol-1:7-disulfonic acid and 80 kilos of sodium carbonate. The combination is finished after a short time; the mass is then heated to 50° C., a small quantity of common salt is added thereto and the dyestuff is filtered, pressed and dried. The thus obtained dyestuff constitutes a yellow-brown powder which dissolves in water with an orange color. When dyed directly upon unmordanted cotton it yields orange-red tints; when diazotized on the fiber and developed with beta-naphthol the said tints turn to a deep yellow-red very fast to washing.

When in the foregoing example the azoxyanilin is replaced by meta-azoxytoluidin, a dyestuff is obtained which dyes unmordanted cotton scarlet-red shades, the vividness of which increases by development on the fiber with beta-naphthol and which simultaneously become absolutely fast to washing. The meta-oxyanisidin gives a blue-red dyestuff. If instead of meta-amidobenzoyl-2:5-amido-naphthol-1:7-disulfonic acid other amidoarylacidylamidonaphtholsulfonic acids are employed, such as for example the meta- or para-amidobenzoyl derivatives of the 2:5-amidonaphthol-7-monosulfonic acid, of the 2:8-amidonaphthol-6-sulfonic acid, of the 2:8-amidonaphthol-6:8-disulfonic acid and of the 1:8-amidonaphthol-3:6-disulfonic acid, three are obtained dyestuffs of similar properties.

Example II: 12.8 kilos of azoxytoluidin (obtained from para-nitro-ortho-toluidin) are diazotized in the usual way and rapidly poured into a common solution of 22 kilos of meta-amidobenzoyl-2-amido-5-naphthol-1:7-disulfonic acid and 18 kilos of meta-amidobenzoyl-2-amido-8-naphthol-6-sulfonic acid in 40 kilos of sodium carbonate. The dyestuff separated in the usual way by heating, salting out, filtering and dyeing forms a brown-red powder. It dyes unmordanted cotton bluish-red tints which by diazotation on the fiber and development with beta-naphthol turns to a scarlet-red.

Instead of pouring, as in the foregoing example, the tetrazo compound directly into a solution of a molecular mixture of two different amidoarylacidyl derivatives, it is obviously possible to proceed in such a way that it is first coupled only with one molecule of an amidoarylacidyl-amido-naphtholsulfonic acid whereupon the resulting intermediate product is brought to react with a second molecule of an amidoarylacidyl derivative.

In an analogous manner we proceed for the manufacture of diazo dyestuffs by using other azoxyamines and other amidoarylacidylamidonaphtholsulfonic acids.

What we claim is:

1. The herein described process for the manufacture of red tetrazo-dyestuffs, which consists in combining one molecule of the tetrazo-derivative of an azoxyamin with two molecules of amidoarylacidyl-amidonaphtholsulfonic acids of the general formula:

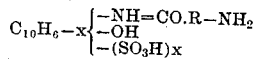

(where R represents the rest of an aromatic radical).

2. The herein described process for the manufacture of red tetrazo-dyestuffs, which consists in combining one molecule of a tetrazotized azoxyamin with two molecules of amidobenzoylamidonaphtholsulfonic acids.

3. The herein described process for the manufacture of tetrazo-dyestuffs, which consists in combining one molecule of a tetrazotized azoxyamin with two molecules of meta-amidobenzoylamidonaphtholsulfonic acids, one at least of the said two molecules being a molecule of meta-amidobenzoyl-2-amido-5-naphthol-1:7-disulfonic acid.

4. As new products, the tetrazo-dyestuffs which can be obtained by combination of the tetrazo-derivative of an azoxyamin with amidoarylacidylamidonaphtholsulfonic acids and which correspond to the formula

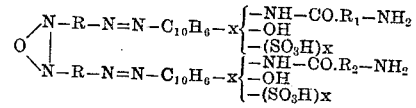

(where R, $R_1$ and $R_2$ signify rests of aromatic radicals), forming in dry state red to reddish-brown powders soluble in water with yellowish-red to bluish-red coloration and dyeing unmordanted cotton orange-red to bluish-red shades which, when further diazotized on the fiber and developed with beta-naphthol, yield valuable red tints fast to washing.

In witness whereof we have hereunto signed our names this 1st day of May, 1907, in the presence of two subscribing witnesses.

KARL JEDLICKA.
ARNOLD SCHEDLER.

Witnesses:
GEO. GIFFORD,
AMAND RITTER.